Feb. 4, 1936. C. E. KOHL 2,029,489
TRANSPORT TRUCK
Filed Sept. 19, 1932 3 Sheets-Sheet 2
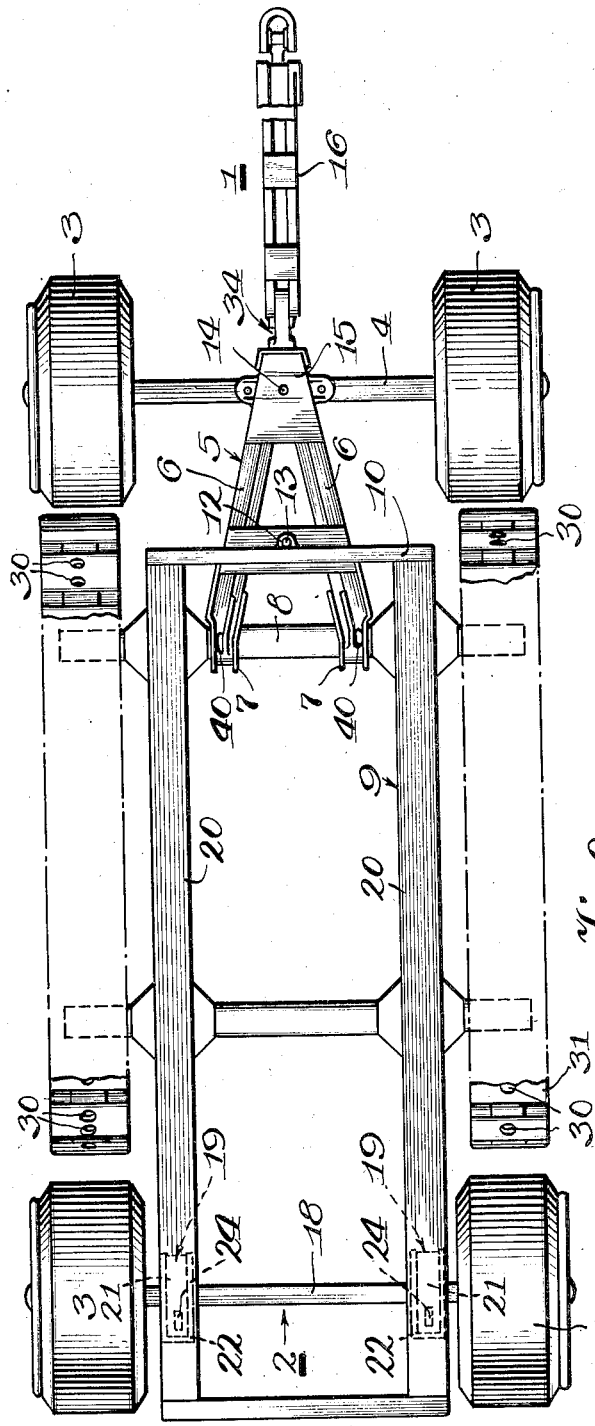
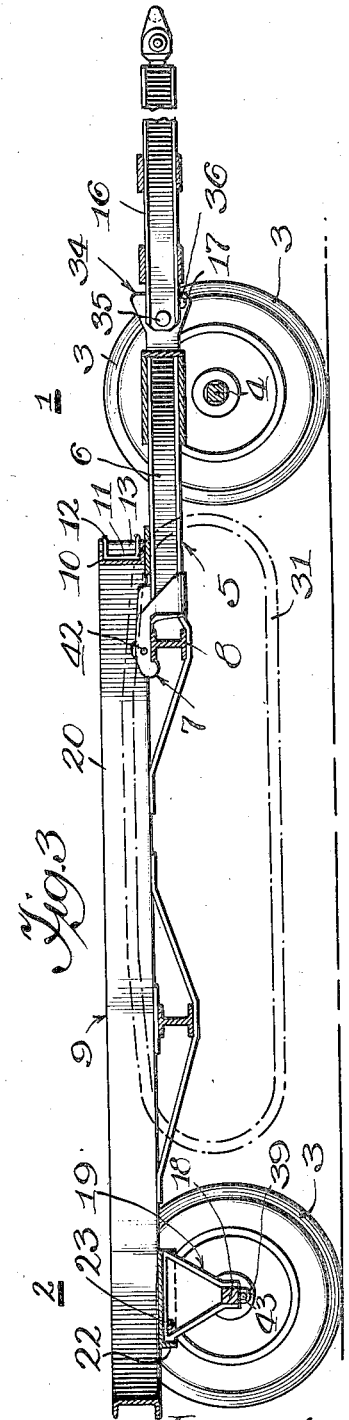
Inventor
Charles E. Kohl, Feb. 4, 1936. C. E. KOHL 2,029,489
TRANSPORT TRUCK
Filed Sept. 19, 1932 3 Sheets-Sheet 3
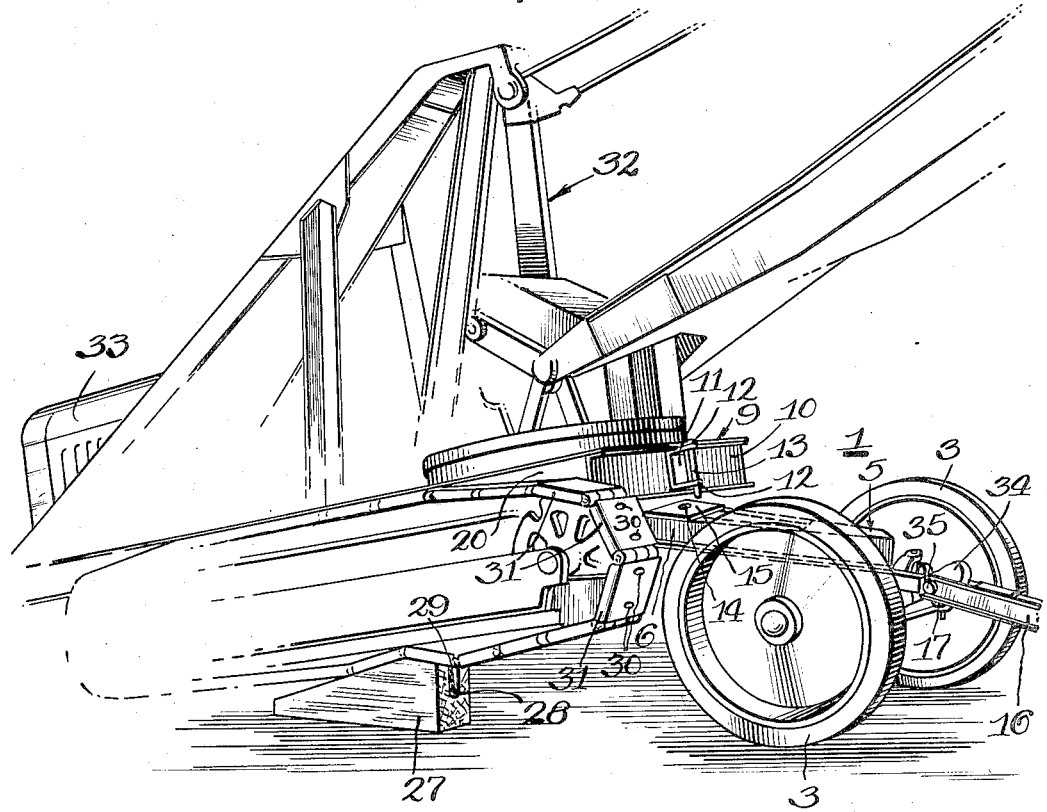
Fig. 4
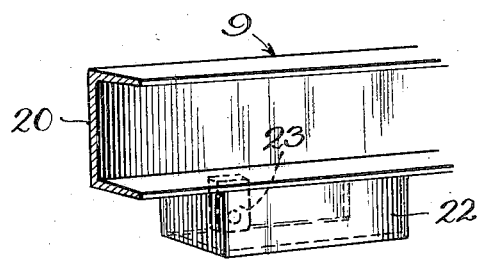
Fig. 6
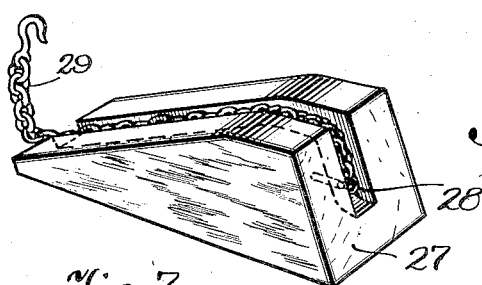
Fig. 7
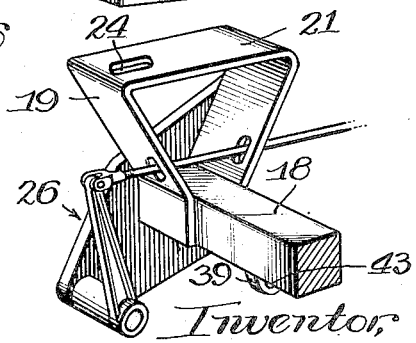
Inventor,
Charles E. Kohl Patented Feb. 4, 1936

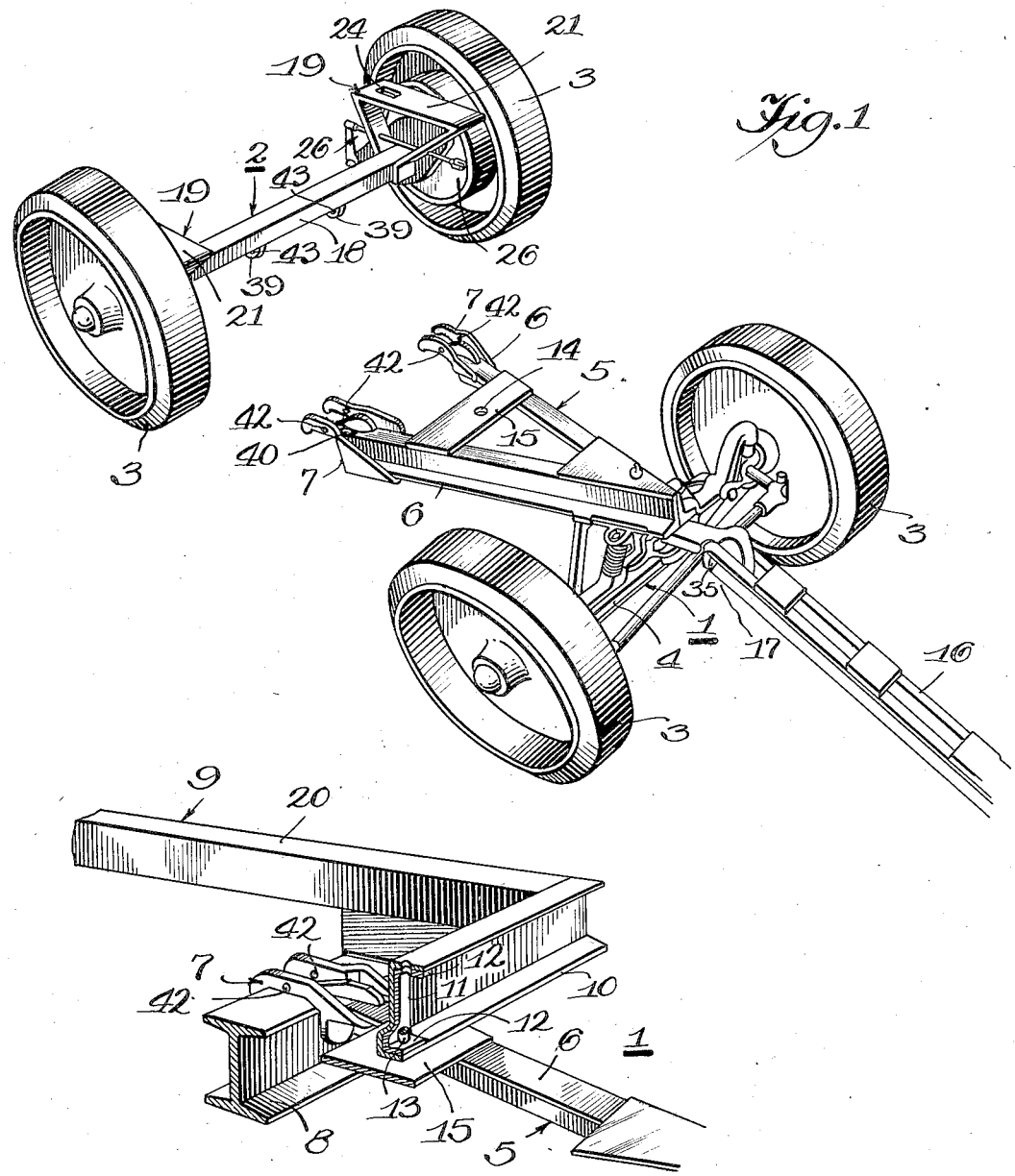

2,029,489

UNITED STATES PATENT OFFICE 2,029,489

TRANSPORT TRUCK

Charles Edward Kohl, Harvey, Ill., assignor to Western-Austin Company

Application September 19, 1932, Serial No. 633,727

12 Claims. (Cl. 280—150)

In machines such as shovels, ditch diggers, crawler type tractors, or vehicles of like character which are mounted on crawler treads and are slow moving, it has always been a problem to the owner or operator as to how they can be rapidly and efficiently moved from place to place, and yet because of the nature of these shovels and other machines, they cannot be mounted upon wheels while in operation. A shovel or the like must be able to negotiate very unusual traction conditions, which would make wheels entirely unsuitable. Another reason is that the weight of a bucket full of material, hanging as it does at the end of a boom and swinging from side to side when loaded, presents a problem of equilibrium without taking into consideration the fact that the surface of the ground may also be very wet.

For the above reasons shovels and such other machines are built with crawlers and because of the very short movements necessary, the travelling speed of the treads is usually made very low, entirely too low and slow to be considered practical for transportation purposes, although very satisfactory when moving the shovel itself up steep grades or across creeks, and in addition furnishing excellent tractive effort when the shovel is locked in position for resisting the pull of a drag line bucket, which is another use for this machine. In such cases, the boom and dipper, as it is sometimes called, are removed and a new boom put on to which the drag line mechanism is connected.

Until the development of the present novel form or type of transport truck, owners or operators of such machines were compelled, when moving from place to place where distances were involved, to rely upon the regular commercial trailers. Such trailers are very expensive and for that reason are usually scarce. These commercial transport trucks require the loading of the machine thereupon, which in itself presents quite a problem owing to the fact that loading and unloading a machine weighing approximately 12 to 20 tons presents considerable difficulties under all circumstances.

The present novel construction of transport truck eliminates all of the above difficulties. It is therefore an object of the present invention to provide a transport truck upon which a shovel or other crawler tread or slow moving vehicle such as a road roller, may be readily and easily mounted, and transported from place to place.

A further object of the invention is the provision of a novel means and method of loading shovels and other heavy and/or slow moving structures so that they may be readily and easily transported.

Another object is the provision of a novel transport truck having front and rear sections provided with supporting wheels. When not carrying a vehicle of the slow moving type described, the sections may be connected together and transported as a compact unit.

A still further object of the invention is the provision of a transport truck having a novel construction of frame for supporting and retaining a shovel, crawler type tractor, road roller or any other heavy, slow moving vehicle or power plant which is difficult to transport.

Another object is the provision of a novel sectional frame construction and means for anchoring the vehicle thereto that is being transported. The invention comprehends novel engaging means, brackets and pins whereby there can be no relative movement between the transport truck and machine or mechanism being carried during transportation thereof.

Further objects of the invention are to provide a construction of maximum simplicity, efficiency, economy and ease of assembly and operation, and such further objects, advantages and capabilities as will later more fully appear and are inherently possessed thereby.

The invention further resides in the combination, construction and arrangements of parts illustrated in the accompanying drawings, and while there is shown therein a preferred embodiment, it is to be understood that the same is susceptible of modification and change, and comprehends other details and constructions without departing from the spirit of the invention.

In the drawings:

Fig. 1 is a disassembled view of the present transport truck.

Fig. 2 is a plan view of the truck and showing the frame of shovel or other structure being carried.

Fig. 3 is a view in side elevation of the structure shown in Fig. 2.

Fig. 4 is a view in perspective of an end of a shovel being mounted on the forward end or section of the truck.

Fig. 5 is a fragmentary view in perspective of a portion of the forward section and its means for anchoring to and suspending an end of the frame of the shovel.

Fig. 6 is a fragmentary disassembled view in perspective of the means for mounting and sustaining the opposite end of the frame.

Fig. 7 is a view in perspective of one of the elevating blocks.

Referring to the disclosure in the drawings and more particularly to Fig. 1, the novel construction of the truck includes a forward truck section 1 and a rear truck section 2, each provided with a pair of supporting wheels 3. The forward section has its wheels mounted on an axle 4. Suitably mounted on this axle is an A-shaped frame 5 with the legs 6 of the A extending rearwardly and each provided with a hook portion 7 adapted to hook over and connect with a cross bar or brace member 8 mounted on the shovel or other machine being transported. The main frame 9 of the machine at its one end is provided with a cross member 10 having a bracket 11 provided with lugs 12 upon which is slidably mounted a pin 13 adapted to seat in an opening 14 in a cross plate 15 on the frame 5. The forward end of this frame 5 has pivotally connected thereto a draft pole or tongue 16 having a removable brace pin 17 for retaining the pole in raised position.

The rear truck section 2 has its wheels 3 mounted on an axle 18. Suitably connected to this axle are a pair of brackets 19, one being mounted adjacent each wheel and in a position to receive the side rails 20 of the frame 9. These brackets 19 are substantially triangular in shape with the base 21 of the triangle being adapted to be received within a housing or enclosure 22 mounted on the side rails 20 whereby these brackets 19 sustain the weight of the frame 9. Also mounted on the under side of the rails 20 is a lug 23 adapted to be received within an opening 24. A pin is adapted to pass through an opening in the lug whereby to lock the lug and frame 9 upon the brackets. Suitable brake mechanism 26 may be provided for the rear wheels.

In order to elevate the shovel or other machine or vehicle to be transported, the invention comprehends the provision of a novel block construction upon which the crawler treads are run. This block comprises a wedge-shaped member 27 having a centrally and longitudinally arranged groove or slot 28 in which is mounted a chain 29, the other end of the chain being adapted to be connected to or hooked into openings 30 in the crawler treads 31.

The end of the chain 29 connected to the elevating block is mounted adjacent the high or upper end of the block. Thus as the tread is crawling up the block, the chain will rest in the groove 28.

Referring more particularly to Fig. 4 of the drawings, the method of mounting the shovel or other machine or mechanism on the transport truck, consists in the end of the shovel 32 opposite the power plant 33 being run upon a pair of these blocks 27 which are placed in front of the tread and the shovel is driven part way up the tapered or inclined surface so that the shovel frame is elevated sufficiently to permit the truck section to be placed or shoved under the frame and attached thereto. In view of the inclined position of the shovel frame, it is necessary, after the frame 5 of the truck section is placed under the shovel, to back the shovel off of the block while at the same time trailing the truck with the shovel frame until the cross member or brace part 10 of the shovel frame rests securely upon the frame 5 of the transport truck. Obviously, the shovel frame rests upon the end of the tread nearest the motor 33 and the transport truck section 1 beneath the boom 32 with the tread that is immediately behind the wheel, suspended off of the ground. In this position, the hook portions 7 of the frame 5 hook over and connect with the cross bar or brace member 8 on the shovel frame and the pin 13 is seated in the opening 14 in the cross plate 15.

When the front truck section is placed in the position outlined above, the pin 13 will control the lateral position of the front truck section while the hook members 7 will resist the draft necessary to draw the device, the downward pressure or weight of the shovel thus tending to lock the combination together and this locking effect is in proportion to the weight of the load carried. As clearly disclosed in Fig. 3, the coupling member 34 to which the draft pole or tongue 16 is pivotally connected by the pin 35 is provided with a lower opening 36. Normally, this pole or draft member is free to pivot. However, when it is desired to manipulate the front truck section in place below its end of the shovel frame, the pin 17 is placed in this lower opening 36 so that when the pin 17 is placed in position, the pole becomes rigid and when weight is placed on the other end of the pole, the opposite end of the frame 5 is raised off the ground and can therefore be pushed backwards below the frame of the shovel or other machine and hooked over the cross member 8 without the operator getting underneath the shovel. In other words, this prior operation can be controlled by the manipulating of the truck section from the pole alone.

After the front section 1 has been securely mounted in position, the shovel or other machine is operated to cause the treads on the opposite end of the track to crawl up the blocks which have been placed in reversed position, thereby raising the opposite end of the shovel frame to permit placing thereunder the rear truck section 2. After the shovel has been raised at this end, the rear truck section is shoved thereunder with the base 21 of the brackets 19 placed uppermost. As the crawler treads are again backed off of the block, each base 21 which forms the upper portion of the brackets 19 seats within the housing or enclosures 22 which are on the underside of the side rails 20 of the shovel frame. As the shovel is placed upon the rear truck section, each lug 23 is received within an opening 24 on the brackets 19. When the pins are placed in position in the openings 24, the shovel frame and rear truck section are locked in position and the shovel or other mechanism is ready for transportation.

In order to transport the truck when not in use, the front and rear sections 1 and 2 may be connected as a unit. This is accomplished by turning or reversing the rear axle 18 so that the base 21 of the brackets is lowermost, and passing the lugs 39 on the axle 18 through openings 40 in the hook portions 7 on the A frame 5. A pin is then passed through openings 42 and 43 in these members 7 and the lugs 39 respectively, to lock the front and rear truck sections together to permit their transportation as a unit.

Although the description has referred most generally to the transportation of a power driven shovel having crawler treads, it is to be understood that many other machines may be transported by the present novel truck construction. In fact, the present construction of truck may be placed under any and all machines that are heavy, slow moving and hard to transport, such as crawler type tractors, road rollers and the like.

Having thus disclosed the invention, I claim:

1. A truck assembly for transporting standard constructions of slow moving vehicles such as shovels, crawler type tractors, road rollers and the like, comprising front and rear sections provided with supporting wheels and an axle, a frame forming a part of said front section and mounted on and carried by the axle of said section, and supporting members forming a part of the rear section and mounted on and carried by the axle of said rear section, said frame and members adapted to be connected to the vehicle for sustaining and carrying the weight thereof.

2. A truck assembly for transporting standard constructions of slow moving vehicles such as shovels, crawler type tractors, road rollers and the like, comprising truck sections each provided with an axle and supporting wheels for sustaining and carrying the vehicle to be transported, and brackets forming a part of the rear section connected to and carried by the axle of said section and adapted to be mounted beneath the frame of the vehicle for sustaining the weight thereof.

3. A truck assembly for transporting standard constructions of slow moving vehicles such as shovels, crawler type tractors, road rollers and the like, comprising front and rear truck sections each provided with an axle and supporting wheels for sustaining and carrying the vehicle to be transported, and a frame forming a part of the front section and mounted on the axle of said section adapted to be positioned under the frame of the vehicle for suspending the vehicle above the ground and sustaining the weight thereof.

4. A truck construction for transporting slow moving vehicles such as shovels, crawler type tractors, road rollers and the like, comprising truck sections each provided with an axle and supporting wheels for sustaining and carrying the vehicle to be transported, and a frame on the axle of the front section and forming a part of said section adapted to be positioned under the frame of the vehicle and with a part thereof hooked over a cross member on said vehicle for suspending the vehicle above the ground and sustaining the weight thereof.

5. A truck construction for transporting slow moving vehicles such as shovels, crawler type tractors, road rollers and the like, comprising front and rear truck sections each provided with an axle and supporting wheels for sustaining and carrying the vehicle to be transported, and an A-shaped frame on the front truck section adapted to be mounted under the frame of the vehicle to be transported with the projections of the A-shaped frame adapted to clamp onto a cross member of the vehicle whereby to sustain and carry the vehicle.

6. A truck assembly for transporting standard constructions of slow moving vehicles such as shovels, crawler type tractors, road rollers and the like, comprising front and rear truck sections each provided with an axle and supporting wheels for sustaining and carrying the vehicle to be transported, a frame forming a part of the front section assembly and members forming a part of the rear section assembly, said frame and members being adapted to be positioned beneath the frame of the vehicle to be transported.

7. A truck assembly for transporting standard constructions of slow moving vehicles such as shovels, crawler type tractors, road rollers and the like, comprising front and rear truck sections each provided with an axle and supporting wheels for sustaining and carrying the vehicle to be transported, a frame forming a part of the front section assembly and members forming a part of the rear section assembly, said frame and members being adapted to be positioned beneath the frame of the vehicle to be transported, and interconnecting means on said vehicle frame, first mentioned frame and members for anchoring the vehicle to the truck.

8. A truck assembly for transporting standard constructions of slow moving vehicles such as shovels, crawler type tractors, road rollers and the like, comprising truck sections each provided with an axle and supporting wheels for sustaining and carrying the vehicle to be transported, and brackets mounted adjacent the opposite wheels and forming a part of one of said sections for sustaining the weight of one end of the vehicle.

9. A truck construction for transporting slow moving vehicles such as shovels, crawler type tractors, road rollers and the like, comprising truck sections each provided with an axle and supporting wheels for sustaining and carrying the vehicle to be transported, and an A-shaped frame on one of said sections adapted to be positioned under and bear the weight of an end of the frame of the vehicle to be transported, the ends of the legs of the A-shaped frame hooking over a cross member of the vehicle frame and whereby said vehicle may be drawn.

10. A truck costruction for transporting slow moving vehicles such as shovels, crawler type tractors, road rollers and the like, comprising truck sections each provided with an axle and supporting wheels for sustaining and carrying the vehicle to be transported, an A-shaped frame on one of said sections adapted to be positioned under and bear the weight of an end of the frame of the vehicle to be transported, the ends of the legs of the A-shaped frame hooking over a cross member of the vehicle frame and whereby said vehicle may be drawn, and means for connecting the adjacent end of the vehicle frame to the cross bar of the A-shaped frame.

11. A truck construction for transporting slow moving vehicles such as shovels, crawler type tractors, road rollers and the like, comprising truck sections each provided with an axle and supporting wheels for sustaining and carrying the vehicle to be transported, brackets on the axle of one of said truck sections and adapted to be connected to the frame of the vehicle for sustaining the weight of one end thereof, and housings provided on said frame for receiving and enclosing an end of said brackets.

12. A truck assembly for transporting standard constructions of slow moving vehicles such as shovels, crawler type tractors, road rollers and the like, comprising truck sections each provided with an axle and supporting wheels for sustaining and carrying the vehicle to be transported, and triangular shaped brackets mounted on the axle of one of said sections and forming a part of said section, the base of said brackets being adapted to be connected to the frame of the vehicle for sustaining the weight of the vehicle adjacent thereto.

CHARLES EDWARD KOHL.